United States Patent [19]

Espo

[11] Patent Number: 4,705,355
[45] Date of Patent: Nov. 10, 1987

[54] MOTION PICTURE SCREEN ASSEMBLY

[75] Inventor: Andrew M. Espo, Dedham, Mass.

[73] Assignee: Creative Talent, Inc., Boston, Mass.

[21] Appl. No.: 906,998

[22] Filed: Sep. 12, 1986

[51] Int. Cl.[4] .............................................. G03B 21/56
[52] U.S. Cl. .................................................... 350/117
[58] Field of Search ................. 350/117; 160/351, 135

[56] References Cited

U.S. PATENT DOCUMENTS

| | | | |
|---|---|---|---|
| 1,901,963 | 3/1933 | Hansen | 350/117 X |
| 2,528,311 | 10/1950 | Hurley | 350/117 X |
| 2,849,745 | 9/1958 | Madsen | 160/135 X |
| 3,630,309 | 12/1971 | Wenger et al. | 160/351 X |
| 4,406,519 | 9/1983 | Shaw | 350/117 |
| 4,444,240 | 4/1984 | Bannister | 160/135 |
| 4,456,283 | 12/1985 | Numata et al. | 350/117 |

*Primary Examiner*—Richard A. Wintercorn
*Attorney, Agent, or Firm*—I. Stephen Samuels

[57] ABSTRACT

A motion picture screen assembly having a horizontal support beam and having a motion picture viewing screen which is detachably fastened at its upper edge to the support beam. Preferably two lifting rams are located near the ends of the support beam. The lifting rams operate to raise the support beam so that the attached viewing screen assumes a vertical viewing position. The assembly can be put up and taken down both outdoors and indoors, and is completely portable.

18 Claims, 5 Drawing Figures

MOTION PICTURE SCREEN ASSEMBLY

BACKGROUND OF THE INVENTION

There has been an unfilled need for a large, portable motion picture screen assembly which can be quickly erected and quickly taken down, especially for outdoor viewing by large groups of people, such as college students. Such a motion picture screen assembly has to be able to withstand wind forces which create toppling problems. The motion picture screen assembly also must be simple to assemble and simple to erect and take down by relatively unskilled people. Finally, the viewing screen must be large, flat and steady in order to provide a pleasing viewing surface, and the motion picture screen assembly must be able to packed up and transported to another location in a relatively small truck.

SUMMARY OF THE INVENTION

The motion picture screen assembly of this invention, in its preferred embodiment, is comprised of a horizontal support beam, a motion picture viewing screen which is detachably fastened at its upper edge to the support beam, and at least one, and preferably two, lifting rams located near the ends of the support beam. The lifting rams operate to raise the support beam so that the attached viewing screen hangs downwardly and assumes a vertical viewing position.

In order to enhance the stability of the motion picture screen assembly invention, the rams are preferably provided with outriggers at their bases, and guy lines at their upper ends which are staked into the ground. A video tape projector (or a motion picture film projector) is used to project the moving picture image on the viewing screen. A sound system is used to broadcast the audio portion of the motion picture being projected. The audio portion can be projected by conventional audio speakers, or by a low frequency radio transmitter for reception by radio receivers in the viewer's automobiles (or carried by the viewers), or by both audio speakers and a radio transmitter.

DESCRIPTION OF THE PREFERRED EMBODIMENT

Figure 1:
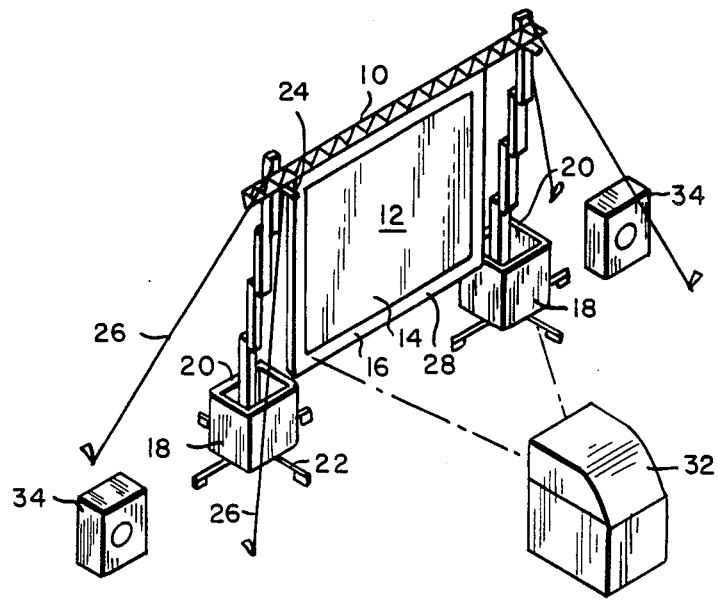
FIG. 1 is a perspective view of the portable motion picture screen assembly of this invention, with the audio and video means being shown, and with the two drape cloths not being shown.

The preferred embodiment of this invention is shown in FIGS. 1–5. FIG. 1 shows the entire invention except for the omission of the drape cloths. The drape cloths are clearly shown in FIGS. 2–3.

The motion picture screen assembly of this invention includes a horizontal support beam 10 which is constructed in the form of a metal truss containing many fastened together truss elements. The support beam 10 is preferably approximately 30 feet in length.

Figure 5:
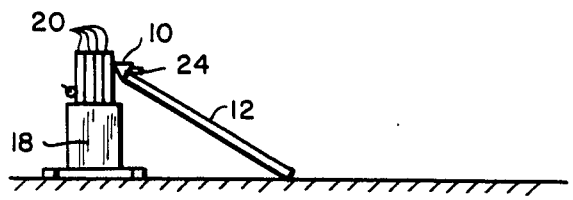
FIG. 5 is a left side elevation of the motion picture screen assembly shown in FIG. 2, with the drape cloths not being shown, and with the viewing screen lowered to a planar, non-vertical, non-viewing orientation.

A motion picture viewing screen 12 is fastened at its upper edge to support beam 10. The viewing screen includes a white screen (usually of vinyl material) 14 which is fastened along its periphery to a rigid rectangular frame 16. White screen 14 is preferably 20 feet wide by 15 feet high. Frame 16 is attached to support beam 10 by a plurality of detachable fasteners. FIGS. 1–4 show the viewing screen 12 in its vertical viewing position. FIG. 5 shows viewing screen 12 in its planar, non-vertical, non-viewing position.

At least one, and preferably two, lifting rams 18 act to raise and lower the support beam 10 and the viewing screen 12. The nature of lifting ram 18 can take a variety of forms. The example shown in the drawings is a mechanical lifting ram which uses a system of pulleys, cranks and gears to cause a number of masts 20 to be vertically extended upwardly or retracted downwardly (compare FIG. 4 with FIG. 5). These masts 20 could be telescoping or offset. The lifting ram 18 could be mechanically-powered, hydraulically-powered or pneumatically-powered. Presumably, other means of power could be utilized. The bottom portion of the ram 18 is contained in a housing 20 from which a number of outriggers 22 extend horizontally to provide substantially increased stability. A horizontal forwardly extending support member 24 is mounted on the uppermost mast 20. Support beam 10 is detachably fastened to support member 24. As shown in FIG. 1, each lifting ram 18 is detachably fastened to the support beam 10 adjacent one of the ends of the support beam.

Preferably, lifting rams 18 can be operated to reach a height of approximately 24 feet. Thus, lifting rams 18 can be operated to raise viewing screen 12 to approximately 5 feet above the ground (see FIG. 4). When lifting rams 18 are retracted downwardly, the viewing screen 12 is pivoted (with the assistance of one or two workmen) so that the bottom of viewing screen touches the ground and the top of viewing screen 12 is held approximately five feet above the ground (see FIG. 5). This is the viewing screen's planar, non-vertical, non-viewing position.

As shown in FIGS. 1–4, to provide added stability to the assembly, guy lines 26 are affixed to the upper ends of the lifting rams 18 and staked in the ground. Placement of the guy lines as shown provides considerable additional stability to the screen assembly to prevent its being blown over in the event of high winds.

Figure 2:
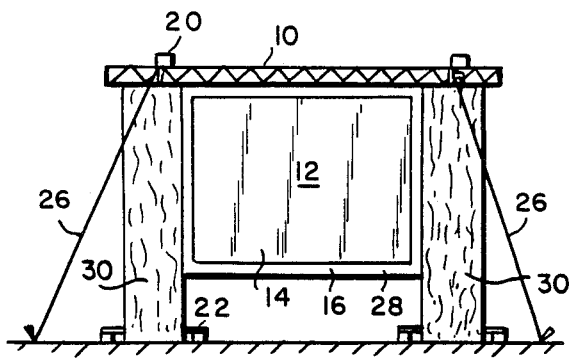
FIG. 2 is a front elevation of the motion picture screen assembly shown in FIG. 1, with two drape cloths being shown, and with the audio and video means not being shown.
Figure 3:
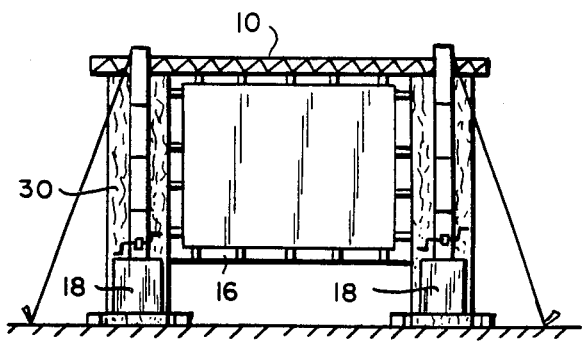
FIG. 3 is a rear elevation of the motion picture screen assembly shown in FIG. 2.
Figure 4:
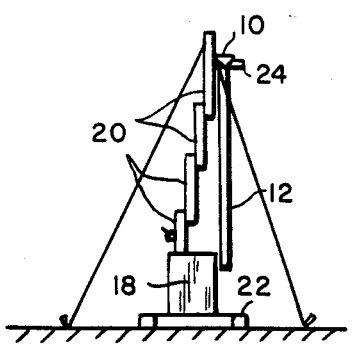
FIG. 4 is a left side elevation of the motion picture screen assembly shown in FIG. 2, with the drape cloths not being shown, and with the viewing screen raised to a vertical viewing orientation.

In order to improve the contrast between the white vinyl screen 14 and the adjacent background, the frame 16 is provided with a black front surface 28. Also, two black drape cloths 30 are detachably affixed to the support beam 10 to either side of the viewing screen 12. Thus, as shown in FIG. 2, drape cloths affixed to the support beam 10 to either side of the viewing screen 12. Thus, as shown in FIG. 2, drape cloths 30 are vertically hung so that they hide the lifting rams 18 and partially cover the black front surfaces 28 of frame 16. Optionally, two additional drape cloths can be used; one attached to the support beam and covering the area above the white screen; and the other attached to the viewing screen and covering the area between the white screen and the ground.

A motion picture projector 32 is positioned to project the visual image on viewing screen 12. Preferably, projector 32 is a video tape projector. Alternatively, it could be a motion picture film projector. Alternatively, it could be a rear projector. Sound speakers 34, which are synchronized with projector 32, project the audio portion of the program to the viewing audience. It is within the contemplation of this invention to substitute for sound speakers 34 a low frequency radio transmitter for broadcasting the audio portion of the program for reception by radio receivers possessed by the viewers. For example, if the viewers were sitting in automobiles, the reception could be by their automobile radios. Another means of reception could be by hand-held portable radio receivers. Alternatively, both sound speakers and a radio transmitter could be used simultaneously.

An important feature of this invention is the capability of assembling, putting up, and taking down the entire assembly simply and quickly for transport to another location. For example, with experienced workmen, the screen assembly can be assembled and set up in approximately one hour. It can be taken down and loaded on a truck in less than half that time.

To assemble the invention, frame 16 is first fastened together into a rectangular configuration. Then, vinyl screen 14 is affixed to frame 16. This can be done while all of the elements lie on the ground. The frame 16 is then attached to the support beam 10.

The lifting rams are positioned at their desired locations and their outriggers 22 are extended for stability. The support beam 10 is lifted manually and is secured to support members 24 on lifting rams 18.

Two black drape cloths 30 are affixed to support beam 10 outboard of the viewing screen 12. These drape cloths are normally stored in a rolled condition.

The two lifting rams 18 are operated to raise support beam 10 to approximately 24 feet in height which causes the viewing screen 12 to hang vertically approximately five feet off of the ground. The lifting rams are locked in their extended position and the guy lines 26 (previously affixed to the uppermost masts 20) are driven into the ground to the front and the rear of the assembly at points which are outboard of the lifting rams. The guy lines maintain tension on the tops of the lifting rams to prevent toppling of the assembly even in the event of high winds.

Projector 32 and speakers 34 are operated to project visual images on the screen while audio signals are broadcast to the viewers.

After the program has been completed, the setting up procedure is essentially reversed. The workmen grasp the bottom edge of frame 16 and walk it forwardly as the lifting rams are retracted. This causes the viewing screen 12 to assume the planar, non-vertical position shown in FIG. 5. Then, the frame 16 is detached from support beam 10, drape cloths 30 are detached from support beam 10, the guy lines are detached (or left on) the lifting ram masts. Then, the vinyl screen 14 is detached from the frame 16 and the frame is broken down into its component parts.

The support beam 10 is then detached from the lifting rams 18. Then, the outriggers 22 are retracted into the lower portion of the lifting ram housings 20 and all of the various components of the assembly can be loaded onto a truck for transport to another location.

The screen assembly of this invention can be set up quickly, can be knocked down quickly, and is very secure when set up. It provides a steady viewing surface for the program being shown, yet can be taken down and removed simply and quickly. The screen assembly can be set up outside or within a building. It can be viewed by large numbers of viewers who are seated, or who are in automobiles. The assembly is particularly suitable for use on college campuses, although there is virtually no limitation to the locations at which the screen assembly can be utilized.

The above description obviously suggests many possible variations and modifications of this invention which would not depart from its spirit and scope. It should be understood, therefore, that the invention is not limited in its structure or application to the details specifically described or illustrated and that, within the scope of the appended claims, it may be practiced otherwise than as specifically described or illustrated.

I claim:

1. A portable motion picture screen assembly comprising:
   (a) a horizontal support beam;
   (b) a motion picture viewing screen detachably fastened at its upper edge to said horizontal support beam; and
   (c) at least one vertical ram detachably affixed adjacent its upper end to said horizontal support beam, said ram operating to raise said support beam causing said viewing screen to assume a vertical viewing orientation, said ram also operating to lower said support beam causing said viewing screen to assume a non-vertical non-viewing position.

2. The portable screen assembly of claim 1 wherein said at least one vertical ram comprises two horizontally spaced-apart vertical rams, one said ram affixed adjacent its upper end to adjacent one end of said support beam, the other said ram affixed adjacent its upper end to adjacent the other end of said support beam.

3. The portable screen assembly of claim 2 wherein said two rams are mechanically operated.

4. The portable screen assembly of claim 2 wherein said two rams are pneumatically operated.

5. The portable screen assembly of claim 2 wherein said two rams are hydraulically operated.

6. The portable screen assembly of claim 2 wherein each said ram has horizontally extending ground-engaging outriggers providing stability against tipping of said ram.

7. The portable screen assembly of claim 2 wherein each said ram has guy lines affixed to the upper end of said ram, said guy lines adapted to be staked into the ground to provide stability against tipping of said ram.

8. The portable screen assembly of claim 2 wherein said viewing screen has a substantially rigid reinforcing frame detachably attached thereto.

9. The portable screen assembly of claim 8 wherein said viewing screen non-vertical non-viewing position is more horizontal than vertical.

10. The portable screen assembly of claim 2 further having two dark-colored drape cloths affixed at their upper ends to said support beam at either side of said viewing screen, said drape cloths providing a dark surface along each vertical side edge of said viewing screen, said drape cloths also hiding said rams from frontal viewing.

11. The portable screen assembly of claim 2 wherein said support beam is a metal truss constructed with a multiplicity of fastened together truss elements.

12. The portable screen assembly of claim 2 further having a motion picture projector spaced from said viewing screen, said projector projecting motion picture images on said viewing screen.

13. The portable screen assembly of claim 12 wherein said projector is a video tape projector.

14. The portable screen assembly of claim 12 wherein said projector is a motion picture film projector.

15. The portable screen assembly of claim 2 further having audio speakers located outboard of said two rams.

16. The portable screen assembly of claim 2 further having a low frequency radio transmitter for broadcasting the audio portion for reception by radio receivers possessed the viewers.

17. The portable screen assembly of claim 2 wherein said support beam, said viewing screen, and said rams are detachably attached together, said attached rams operating to pivotally raise said attached screen to its vertical viewing position, and to pivotally lower said screen to a planar, non-vertical, non-viewing position, and wherein said support beam, said viewing screen and said rams are detached from each other for storage and transport to another location.

18. A portable motion picture screen assembly comprising:
 (a) a horizontal metal truss support beam;
 (b) a motion picture viewing screen detachably fastened at its upper edge to said horizontal support beam, said viewing screen having a substantially rigid reinforcing frame detachably attached thereto, said viewing screen having a vertical viewing position and a planar, non-vertical, non-viewing position;
 (c) two horizontally spaced-apart vertical rams, one said ram affixed adjacent its upper end to adjacent one end of said horizontal support beam, the other said ram affixed adjacent its upper end to adjacent the other end of said horizontal support beam, each said ram having horizontally extending ground-engaging outriggers providing stability against tipping of said ram, said rams operating to pivotally raise said viewing screen to its vertical viewing orientation, and to pivotally lower said viewing screen to its planar, non-vertical, non-viewing orientation;
 (d) two dark drapes affixed at their upper ends to said support beam to hang along either side of said viewing screen, said drapes providing a dark surface along each vertical side of said viewing screen, said drapes also hiding said rams from frontal viewing;
 (e) a motion picture projector spaced from said viewing screen, said projector projecting motion picture images on said viewing screen;
 (f) means for directing the audio portion to the viewers; and
 (g) means for detaching all said components from each other to facilitate storage and transport to another location.

* * * * *